United States Patent Office 2,757,096
Patented July 31, 1956

2,757,096

SAND MIXTURE USEFUL IN MAKING MASONRY MORTAR

David Tiersten, Lawrence, N. Y.

No Drawing. Application March 10, 1953,
Serial No. 341,615

1 Claim. (Cl. 106—90)

This invention relates to new and useful improvements in sand mixtures for use in making masonry mortar.

Previously, in making mortar, the sand was mixed with other ingredients at the site of the work, and the control of the character of the materials thus mixed was more uncertain and entailed much time and labor. It was also difficult to control the color of the mortar due to the variations in the character of the sand mixed and produced at the work. Also, the sand mixtures made in situ have not been able accurately to control the amount of entrapped air, have not achieved the proper dispersement of the clay in the mortar, and have not accurately controlled the capacity of the mortar to retain necessary amounts of water, to thus minimize "bleeding."

The main object of the present invention is to present a novel and useful sand mixture which enables the contractor on the job, when the already prepared mixture is delivered at the site, to have only to add cement and water to make the improved mortar. In handling this material he has only to use the same handling equipment as usual to produce a controlled air-entrained mortar with much saving of time and labor.

In brief and general terms, the sand mixture which constitutes the invention comprises a mixture of sand of selected quality as desired, small quantities of a defoaming agent, a clay dispersing agent, and an air-entraining agent. To these are added determined larger amounts of infusorial earth and any active volcanic material.

One form of the mixture involves dry or loose damp sand, with or without clay, small quantities of diethyl hexanol to act as the defoaming agent; small quantities of sodium salt of a condensed mononaphthaline sulfonic acid; and small quantities of the sodium salt of dodecylbenzene sulfonate. To this is added larger quantities of infusorial earth and of an active volcanic material. This mixture may then be delivered to the site of the work and mixed with water and cement to produce a high grade mortar with the above desirable characteristics. When cement is added to this mixture, the cementitious value is obtained and a workable, plastic masonry mortar is produced having the qualities of great strength, watertightness, and resistance to freezing and thawing.

An example of a detail mixture is as follows:

(1) A quantity of damp loose or dry sand (with or without clay);
(2) .005% of diethylhexanol;
(3) .25% of sodium salt of a condensed mononaphthalene sulfonic acid (after determining the clay content of the sand);
(4) .01% of the sodium salt of dodecylbenzene sulfonate, or Vinsol Resin, a proprietary trade name for a resin produced by the distillation of wood, or lauryl sulphate, or any derivative thereof. These will entrain up to 6% of air;
(5) 20% of infusorial earth, diatomaceous earth, or bentonitic clay is added. (The absorbent qualities of these materials give the water-retaining quality desired thereby minimizing "bleeding.")
(6) 20% of any active volcanic material such as the pozzuolanas including calcined altered tuff containing montmorillonite; pumicite; rhyolite, calcareous shales; opaline shales; and opaline rhyolite, or mixtures thereof; and fly ash.

It has been found by experiment and thorough tests that a brick mortar, when made with 1 part of Portland cement by volume, with from 3 to 9 parts of the above mixture, has water-retentive qualities of better than 75% after suction of one minute, according to American Society for Testing Materials specifications.

Comparative tests have shown the following results, where mortars are made to produce results according to Federal Specification SSC–18–B:

Type A mortar (ordinary).—Required compressive strength 1500 p. s. i. at 7 days and 2500 p. s. i. at 28 days. By using 3 parts of my mixture to 1 part of Portland cement, average strength of 3 cubes showed compressive strengths at 7 days to be 2683 p. s. i. and at 28 days to be 4650 p. s. i.

Type B mortar (ordinary).—Required compressive strength 500 p. s. i. at 7 days and 900 p. s. i. at 28 days. By using 6 parts of the mixture to 1 part of Portland cement, average strengths of 3 cubes showed compressive strengths at 7 days to be 600 p. s. i. and at 28 days to be 1208 p. s. i.

Type C mortar (ordinary).—Required compressive strength 200 p. s. i. at 7 days and 350 p. s. i. at 28 days. By using 9 parts of the mixture to 1 part of Portland cement, average strengths of 3 cubes showed compressive strengths at 7 days to be 410 p. s. i. and at 28 days to be 730 p. s. i.

While the invention has been described in detail herein, it is well within the purview of the invention that slight changes in the proportions of the ingredients may be made within the scope of the invention since, as the quality of the sand employed varies, so may the amount of, and character of the clay, as may also the particular ingredient used, in place of the infusorial earth. Furthermore, several volcanic materials may be alternately employed as the circumstances of each case may require. I do not wish, therefore, to be limited to the exact proportions and ingredients set forth except insofar as I may be limited by the scope of the attached claim.

Having thus described my invention, what I claim as new and desire to secure by Letters Patent, is:

A prepared sand mixture for making mortar which includes the following ingredients in the following proportions, measured by volume:

59.735% of sand
.005% of diethylhexanol
.250% of a sodium salt of a condensed mononaphthalene sulfonic acid
.010% of the sodium salt of dodecylbenzene sulfonate
20.000% of infusorial earth
20.000% of an active volcanic pozzuolana.

References Cited in the file of this patent

UNITED STATES PATENTS

| | | |
|---|---|---|
| 64,433 | Lowrey | May 7, 1867 |
| 1,999,147 | Ambrose et al. | Apr. 23, 1935 |
| 2,383,891 | Scripture | Aug. 28, 1945 |
| 2,625,489 | Keating | June 13, 1953 |